United States Patent [19]

VanGinhoven

[11] Patent Number: 4,658,573
[45] Date of Patent: Apr. 21, 1987

[54] SIGNAL DEVICE FOR BALE FORMING MACHINE

[75] Inventor: Robert M. VanGinhoven, Lancaster, Pa.

[73] Assignee: New Holland Inc., New Holland, Pa.

[21] Appl. No.: 720,846

[22] Filed: Apr. 8, 1985

[51] Int. Cl.$^4$ ............................ A01D 39/00; B30B 5/06
[52] U.S. Cl. ..................................................... 56/341
[58] Field of Search ....................... 56/341; 100/88, 89

[56] References Cited

U.S. PATENT DOCUMENTS

| | | | |
|---|---|---|---|
| 4,119,026 | 10/1978 | Sacht | 56/341 |
| 4,212,149 | 7/1980 | Krone et al. | 56/341 |
| 4,224,867 | 9/1980 | Gaeddert et al. | 56/341 |
| 4,246,743 | 1/1981 | Anstee et al. | 56/341 |
| 4,343,141 | 8/1982 | Oellig et al. | 56/341 |
| 4,389,930 | 6/1983 | Rutschilling | 56/341 |
| 4,434,607 | 3/1984 | Campbell et al. | 56/341 |
| 4,470,247 | 9/1984 | Mast | 56/341 |
| 4,545,298 | 10/1985 | Vinud | 56/341 |
| 4,550,557 | 11/1985 | Vissers et al. | 56/341 |
| 4,566,379 | 1/1986 | Decoene et al. | 100/89 |
| 4,567,718 | 2/1986 | VanGinhoven | 56/341 |

Primary Examiner—Paul J. Hirsch
Attorney, Agent, or Firm—Darrell F. Marquett; Frank A. Seemar; Larry W. Miller

[57] ABSTRACT

A round bale forming machine comprising a frame supporting substantially circular rollers at opposite sides of the frame supporting inner and outer portions of an endless flexible apron arranged in a substantially C-shaped configuration upon the sets of rollers with the ends of said configuration spaced apart to comprise an inlet for crop material to be delivered from a pickup head to a bale-forming compartment defined by the inner portion of the apron, drive sprockets on the frame positioned in one end of the C-shaped configuration of the apron adjacent the top of the inlet and takeup guide sprockets on the frame positioned in the other end of the C-shaped configuration of the apron adjacent the bottom of the inlet, the takeup guide sprockets normally holding the portions of the apron taut but being yieldable to permit the inner portion of apron to expand a limited amount against the action of the takeup guide sprockets when a bale of desired predetermined size has been formed, and signal means on said machine interconnected to one of the takeup guide sprockets and operable when the guide sprocket is moved by expansion of the inner portion of the apron to render the signal means operative to alert an operator of the machine that a bale has been formed to desired size.

5 Claims, 6 Drawing Figures

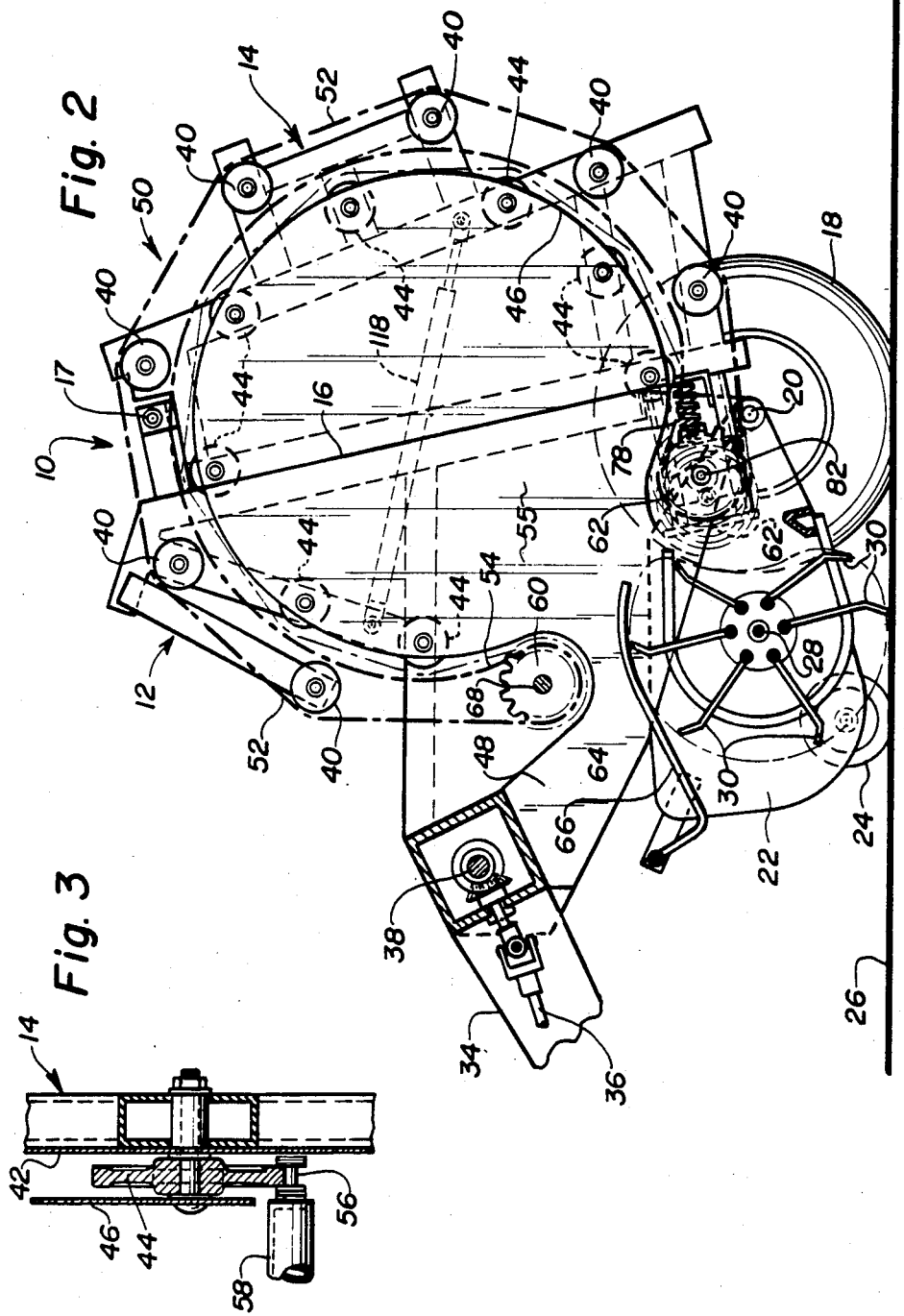

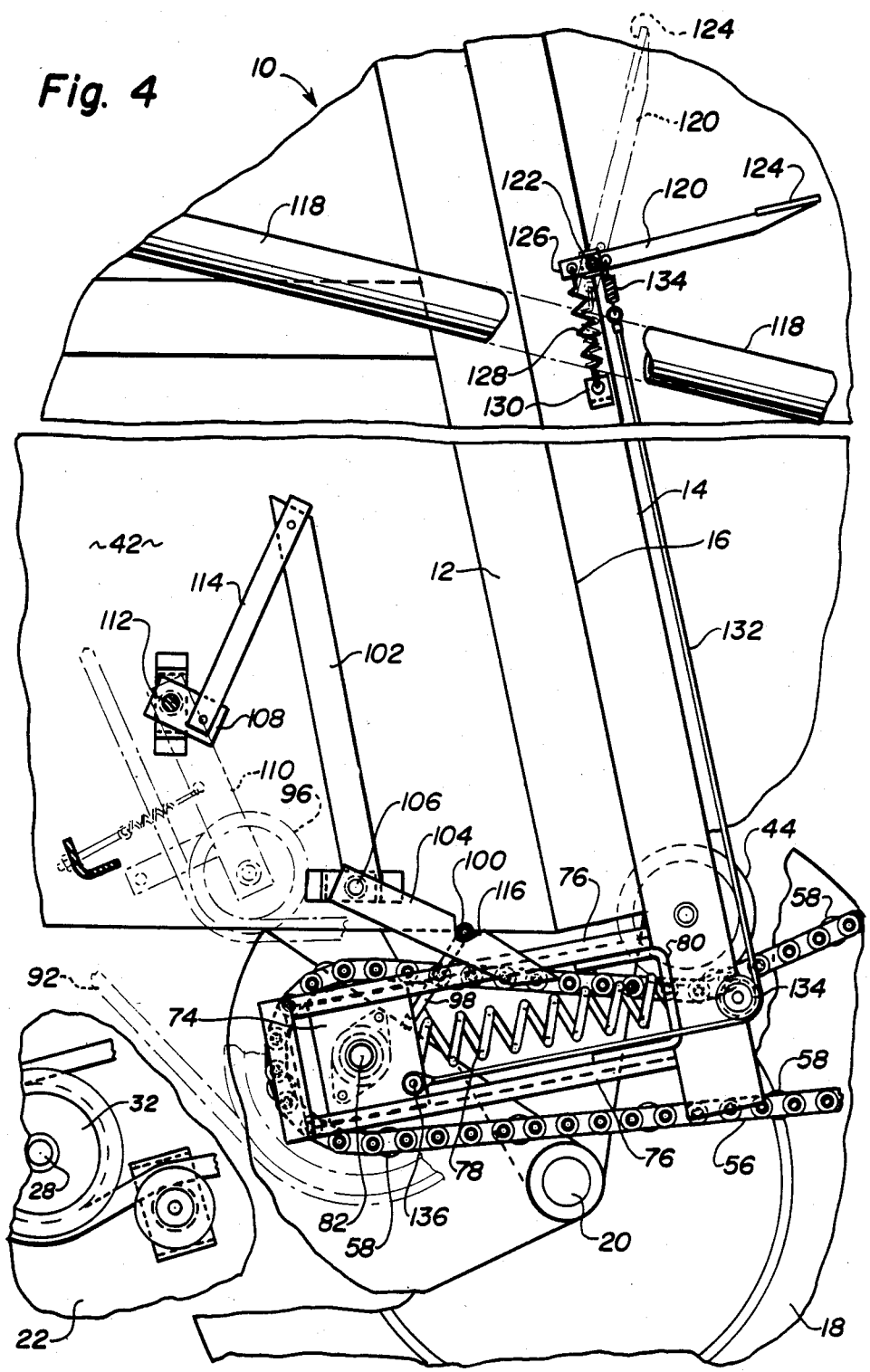

SIGNAL DEVICE FOR BALE FORMING MACHINE

BACKGROUND OF THE INVENTION

This invention pertains to a bale forming machine of the type for making round bales. This type of machine picks up crop material such as hay or straw from windrows in a field by means of a pickup head on the machine and forms the picked up material into round bales by utilizing various mechanisms. Some of these machines produce round bales which have a relatively hard core and succeeding layers wrapped upon said core that are relatively uniform but not as dense as the core. This type of bale does not tend to sag when left in the fields but, if such bale is formed from relatively wet material, the core tends to rot after a period of time. In North America, because there is relatively little baled material which is of a very wet nature, baling machines which form round bales with hard cores have been popular. In certain sections of Europe, as well as other areas in the world, where the climate is much more moist than in North America, it has been found that if a round bale is formed with a soft core, it is possible to prevent rotting of the core. Bales formed with soft cores generally have more dense or harder outer layers or shells but such round bales tend to sag when left for any substantial amount of time in the field.

Typical examples of round baler machines developed heretofore for purposes of forming round bales with soft cores comprise the subject matter of prior U.S. Pat. No. 4,119,026, dated Oct. 10, 1978, in the name of Sacht, and No. 4,212,149, dated Jul. 15, 1980, in the name of Krone et al. In the Sacht patent, a series of endless conveyor belts extend around sets of rollers or drums, the drums being mounted on transverse axes extending between opposite sides of the baler frame, the conveyor belts being arranged in a generally circular pattern with a space provided between two adjacent sets of conveyor belts to comprise an opening into which material is delivered by a pickup head. The conveyor belts move the material generally into a loose spiral and ultimately form a soft core around which somewhat more dense layers are wound until a bale of desired diameter is formed. Furnishing and maintaining the plurality of conveyor belts necessary in this machine results in considerable expense.

In the patent to Krone, a hollow cylindrical winding compartment is provided with a bottom gap through which the crop material is fed by a pick-up device into a substantially cylindrical boundary wall, the inner surface of the boundary wall is swept by an endless apron in the form of transverse slats spaced from each other with the ends thereof connected to endless chains which move in annular channels or guides to ensure that the inner portion of the apron will remain adjacent the inside of the cylindrical boundary wall, while the outer portion of the apron rides around the exterior of the cylindrical boundary wall. In general, the apron comprises a substantially C-shaped configuration, the ends of which are spaced to form the bottom gap referred to above and the apron also extends around a pair of spaced drive rollers or sprockets located adjacent the opposed ends of the C-shaped configuration.

Additional prior U.S. Pat. No. 4,434,607, dated Mar. 6, 1984, in the name of Campbell, is an example of a baling machine adapted to form round bales with hard cores. To prevent the machine from being overfilled, a trip lever and an actuating lever serve to interrupt the driving of the pickup header of the machine and thereby prevent structural damage to the machine.

The present invention is directed to a machine of the type to form round bales with relatively soft cores surrounded by layers of crop material becoming more dense toward the outer surface of the bale. The mechanism by which such bales are formed is simpler and less complex than similar mechanisms of other machines as described above.

SUMMARY OF THE INVENTION

It is among the principal objects of the present invention to provide a crop baling machine of the type for producing round bales in which a cylindrical bale forming compartment receives crop material from a pick-up head, the bale forming compartment being defined by an endless apron which extends around inner and outer sets of guide members arranged in concentric circular patterns, the endless apron being arranged in a substantially C-shaped configuration upon said sets of guide members with the ends of the configuration spaced sufficiently apart to comprise an inlet for crop material to be delivered into the bale forming compartment. The machine also includes drive sprockets positioned at one end of the C-shaped configuration of the apron adjacent the top of the inlet and takeup guide sprockets positioned at the other end of the C-shaped configuration of the apron adjacent the bottom of the inlet, the takeup guide sprockets normally holding the concentric portions of the apron taut but being yieldable to permit the inner portion of the apron to expand a limited amount against the action of the takeup guide sprockets when a bale of desired predetermined size has been formed.

The machine also includes an indicating means, either visual or audible, which functions when a bale of desired size has been formed, to notify the operator that the bale has reached a desired size and the operation of the machine is to be stopped and the completed bale discharged.

Another object of the invention is to provide, specifically, an indicating means comprising a pivoted lever having an indicator on one end and operated by a flexible cord or cable connected between said lever and the takeup guide means that is movable upon the formation of a bale of desired size in a manner to permit a spring to elevate the lever and indicator to a position to be observed by the operator.

BRIEF DESCRIPTION OF THE DRAWINGS

FIG. 2 is a side elevation similar to FIG. 1 but also showing in schematic manner the drive sprocket and takeup guide sprockets engaging the apron of the machine, said view being simplified from that shown in FIG. 1 to better illustrate said machine.

FIG. 3 is a fragmentary vertical section taken on a line 3—3 of FIG. 1.

FIG. 4 is a fragmentary, enlarged sectional elevation showing still further details of the mounting of the takeup guide sprockets and the manner in which the disconnect mechanism function to stop operation of the pick-up head.

DETAILED DESCRIPTION OF THE PREFERRED EMBODIMENT

Figure 1:
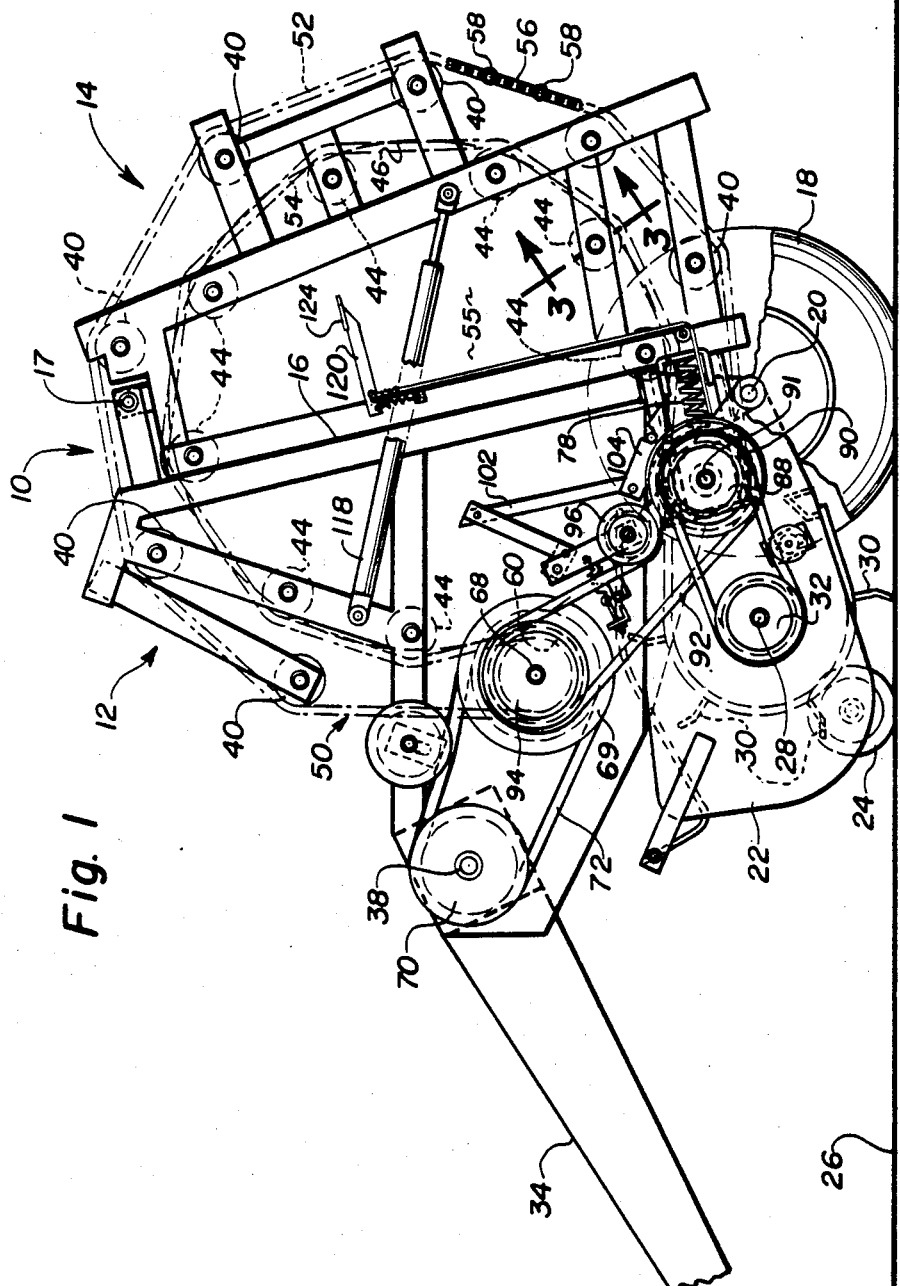
FIG. 1 is a side elevation of a round bale forming machine embodying the principles of the present invention.

Referring particularly to FIGS. 1 and 2, it will be seen that the machine embodying the principles of the present invention includes a frame 10 composed of a plurality of integrally connected structural members such as channels and rectangular tubes, the frame also being bi-partite with a forward portion 12 and a rearward tailgate 14, said forward portion and tailgate meeting along a line 16 as clearly shown in FIGS. 1 and 2 and said tailgate 14 being pivotally connected to the forward portion 12 of frame 10 by pivot pins 17. Frame 10 also is mobile by means of a pair of large wheels 18 mounted upon axle 20. Axle 20 also pivotally supports a pickup head 22 which has wheels 24 to support the forward end of the pickup head above the field surface 26.

The pickup head 22 includes side plates spaced transversely apart which support a drive shaft 28 for the rotatable fingers 30. The shaft 28 is driven by a sheave 32 which is fixed to one end of shaft 28. Frame 10 also includes a forwardly and downwardly extending tongue 34, the forward end of which, not shown, is connectable to suitable power means such as a tractor, the tractor being provided with a p.t.o. which drives input shaft 36 shown in FIG. 2 which, in turn, drive bevel gears that drive the output shaft 38.

The various structural members of the forward frame portion 12 and tailgate 14 support a series of relatively narrow rollers 40 which comprise an outer set of guide members which are circumferentially spaced around an outer circular pattern, duplicate sets of said rollers respectively being disposed at opposite sides of the frame 10. While the term "rollers" is used to denote a general type of rotatable supportring member, they also may comprise idler sprocket gears. It also will be understood that the structural members comprising the forward portion 12 and tailgate 14 of frame 10 are disposed against the outer surfaces of sheet-like side plates 42, one of which is fragmentarily shown in FIG. 3 on the inner side of the structural members shown therein.

An inner set of guide members such as rollers 44 are disposed in a generally inner circular configuration or pattern and these rollers 44 are primarily supported upon the forward frame portion 12 by a disc member 46, which is outlined by a heavy line in FIG. 2 and by a phantom line in FIG. 1, the major portion of the member 46 actually comprising a disc but also having a forward and upward extension 48 as clearly shown in FIG. 2. The disc member 46 also is shown fragmentarily in FIG. 3 and said figure also shows the mounting of the inner set of rollers 44. It also is to be understood that FIG. 2 is substantially a vertical sectional view through the machine approximately at the center thereof and comprises an inner view of one side of the machine, whereby it will be seen that shafts 28 and 38 are in section.

Extending around the inner and outer sets of rollers 40 and 44 is an endless flexible apron 50 which is shown in phantom in FIG. 1 and outlined by a broken line in FIG. 2, the apron includes an outer portion 52 and an inner portion 54, said inner and outer portions preferably being concentric and respectively supported by the rollers 44 and 40 to form a substantially cylindrical bale-forming compartment 55 shown in FIGS. 1 and 2.

Figure 5:
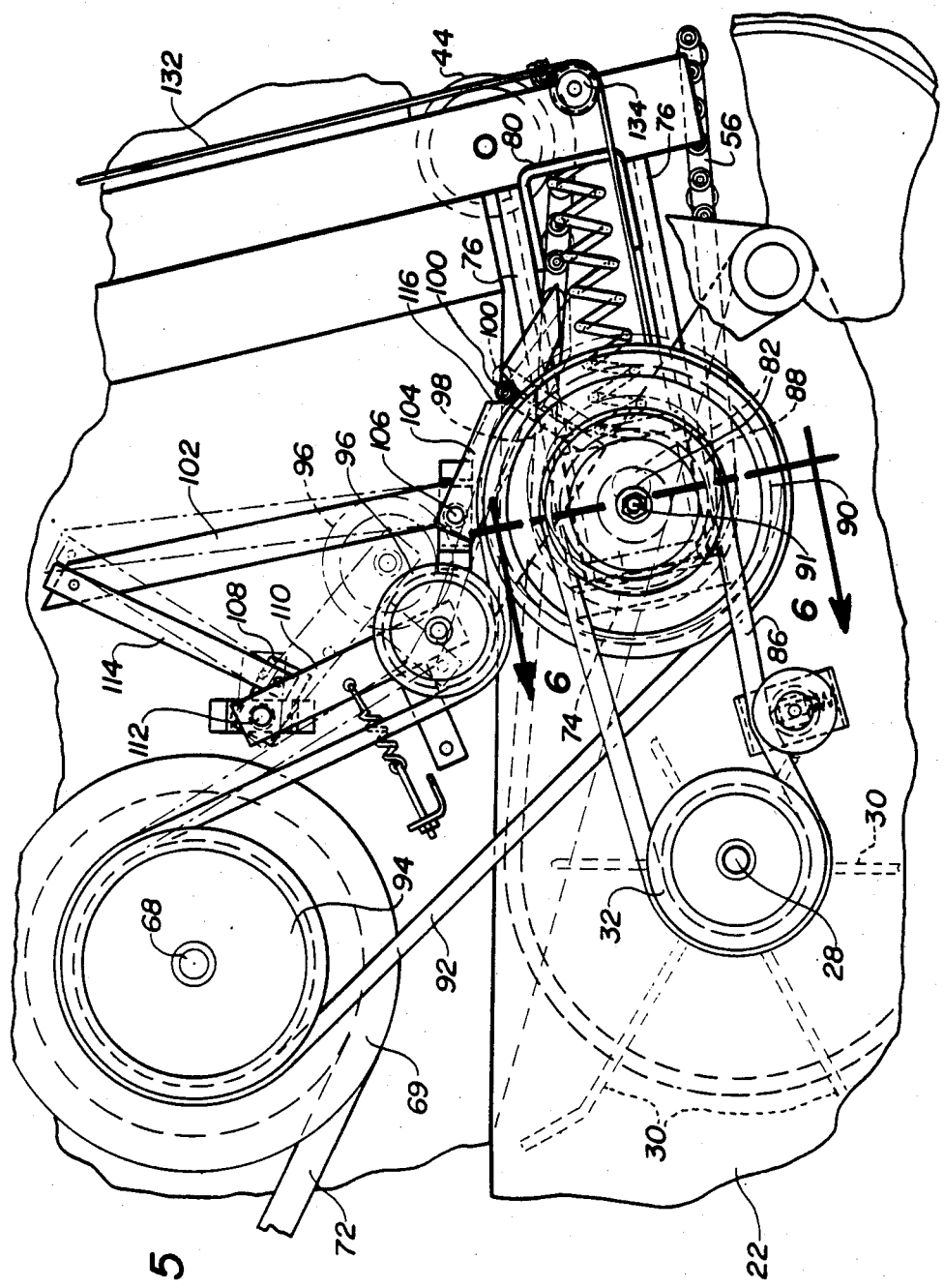
FIG. 5 is another fragmentary side elevation showing additional details of the drive and disconnect mechanism and particularly showing one position for the actuating member of the disconnect mechanism in full lines and an alternate position shown in phantom in which the cam lever of the disconnect mechanism is also shown in disconnect position.

The apron 50 preferably is of conventional construction and comprises a pair of endless flexible chains 56 such as shown fragmentarily in FIGS. 4 and 5 and in section in FIG. 3, said chains respectively being disposed adjacent the opposite inner surfaces of the side plates 42 of the forward portion 12 and tailgate 14. Extending between said pair of chains are a series of evenly spaced rods 58, the ends of which are appropriately connected to said chains.

As shown in FIGS. 1 and 2, it will be seen that the inner and outer portions of the apron 50 define a C-shaped configuration which encloses the bale-forming compartment 55. At the ends of the C-shaped configuration, the apron 50 extends around drive sprockets 60 and takeup guide sprockets 62 respectively mounted adjacent opposite sides of the frame 10. The space 64 between said opposite ends of the C-shaped configuration comprises an inlet to the bale-forming compartment 55 through which material picked up by the pickup head 22 is delivered to said compartment 55. The pickup head 22 also includes a series of windguard tines 66 of conventional nature.

Drive sprockets 60 respectively are supported upon the opposite ends of a shaft 68 for engagement with the apron chains 56. One end of shaft 68 has a sheave 69, see FIGS. 1 and 5, connected thereto. Output shaft 38 also has a sheave 70 fixed thereto and a belt or chain 72 extends therearound to deliver power to sheave 69, shaft 68 the drive sprockets 60.

Referring particularly to FIG. 4, each takeup guide sprocket 62 is supported by a bearing housing 74 slideable within a pair of parallel guides 76. A compression spring 78 extends between a fixed stop 80 on tailgate 14 of the frame 10 and the bearing housing 74, the takeup guide sprockets 62 being mounted upon a transverse shaft 82 supported by the bearing housings 74. The springs 78 as can be fully appreciated, especially from FIGS. 1 and 2, operate to maintain the apron 50 taut but also permit the inner portion 54 of the apron 50 to expand at least a limited amount when a bale of desired size has been formed within the compartment 55, the yieldability of the takeup guide sprockets 62 permitting such expansion and when that occurs, the present invention provides means for automatically disconnecting the drive to the pickup head 22 and thus prevents structural damage to the machine, the disconnection of power to the pickup head being described as follows.

Figure 6:
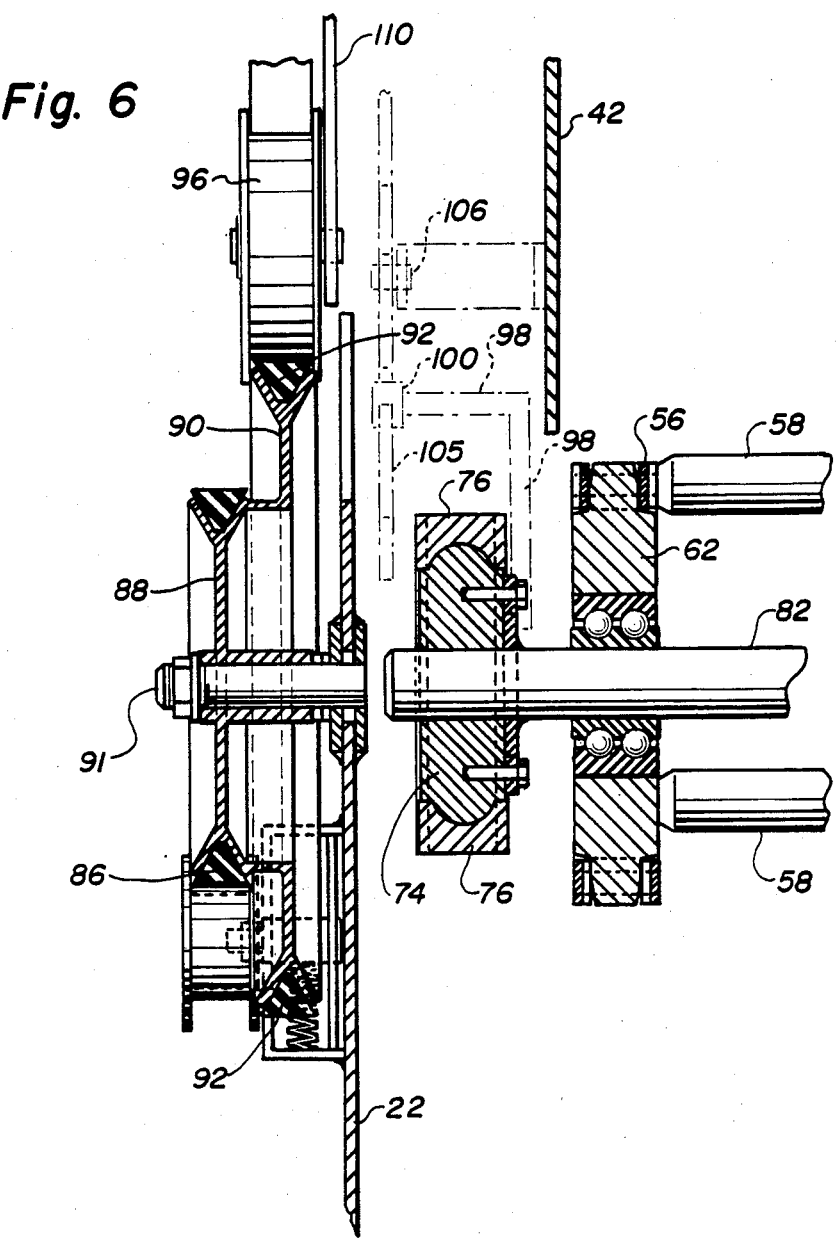
FIG. 6 is a vertical sectional view of fragmentary nature taken on the line 6—6 of FIG. 5 and showing the operative relationship of one of the takeup guide sprockets with respect to the disconnect mechanism and the drive for the pick-up head.

Still referring particularly to FIG. 4, but also to FIGS. 5 and 6, the fingers 30 of pickup head 22 are driven by sheave 32 fixed to shaft 28 and around which drive belt or chain 86 extends, the latter also extending around driven sheave 88 which is fixed to a drive sheave 90 as clearly shown in FIG. 6, said sheaves being freely rotatably upon stub shaft 91 as shown in FIG. 5 and 6. An endless drive belt or chain 92 extends around a second sheave 94 which is fixed to drive sheave 69 and said belt or chain 92 also extends around sheave 90. Belt or chain 92 is of such length that it can loosely extend around sheaves 90 and 94 and when in loose condition, drive of the pickup head 22 does not occur. To effect such driving, however, a belt-tightening roller 96, as shown in FIG. 5, is movable between full line tightening position and phantom slack position. Such movement is effected by the following mechanism.

Acutating member 98 is fixed to bearing housing 74 and a roller 100 is pivotally mounted upon the outer end thereof as shown in FIGS. 4-6. A bell crank composed of integrally connected arm 102 and cam lever 104 is pivotally supported upon a fixed pintle 106 attached to one of the side plates 42 as shown fragmentarily in FIG. 6. Another bell crank composed of the short link 108 rigidly connected to a spring-biased lever 110 which carries the belt-tightening roller 96 is supported for limited pivotal movement by another fixed pintle 112 supported by side plate 42 as shown in FIG. 4. Extending between the short link 108 and arm 102 is another link 114, the opposite ends of which are freely pivotally connected thereto.

The operation of the disconnect mechanism for the pickup head 22 is as follows. When a bale of predetermined size has been formed within the compartment 55, the inner portion 54 of the apron 50 expands a limited amount for example, to the size shown in FIG. 2 as represented by the broken line, said inner portion 54 of the apron 50 then being disengaged from the inner set of rollers 44. When such expansion occurs, it causes the takeup guide sprockets 62 to move, for example, from the phantom position shown in FIG. 2 to the full line position or, as shown in FIG. 5, the extent of movement of the sprockets 62 is represented by the phantom position of the shaft 82 which also causes actuating member 98 and roller 100 to move from the full line positions to the phantom positions. The roller 100 is disposed within a notch 116 in cam lever 104 and such movement of the roller 100 causes clockwise rotation of the cam lever 104 on pintle 106 and this effects movement of the interconnected bell cranks and link 114 as illustrated in phantom and thereby moves the belt-tightening roller 96 from the full line tightening position to the phantom slack position, thus disconnecting the power from sheave 90 and thus stopping movement of the rotatable fingers 30 of the pickup head 22. As is readily apparent, such disconnection of power is effected automatically when the size of the bale formed within the compartment 55 is that which is desired and for which the mechanism has been set.

When a bale of desired size has been formed and, for example, the operation of the pickup head 22 has been stopped, it will be seen that the present invention also includes hydraulic units 118, the opposite ends of which respectively are connected to the forward portion 12 of the frame and the tailgate 14 as clearly shown in FIGS. 1 and 2. The hydraulic units 118 are operated preferably by control means, not shown, mounted on the tractor, for example, and connected by suitable flexible conduits, not shown, between a pump on the tractor and the units 118. Under such circumstances, only relatively low hydraulic force is required to effect such elevation of the tailgate 14 to conventional discharge position, not shown in the drawings. Appropriate control mechanism, also of conventional nature and not illustrated, is used to control the operation of the units 118.

The bale-forming machine described above also contemplates the use of signal mechanism either of visual or audible nature to notify the operator of the tractor, for example, that a bale of desired size has been formed within the compartment 55. Referring particularly to FIGS. 1 and 4, one example of signal means is illustrated which, for example, is of a visual nature and comprises a lever 120 pivotally mounted intermediately of its ends upon a pintle 122 supported by the tailgate 14. A visual signal indicator 124 is fixed to one end of the lever 120 at a location substantially farther from the pintle 122 than the opposite end 126 of the lever 120 to which one end of a tension spring 128 is connected and the opposite end of spring 128 is connected to a fixed member 130 attached to the tailgate 14. A visual signal indicator 124 is fixed to one end of the lever 120 at a location substantially farther from the pintle 122 than the opposite end 126 of the lever 120 to which one end of a tension spring 128 is connected and the opposite end of spring 128 is connected to a fixed member 130 attached to the tailgate 14. An elongated flexible member 132 such as a cable or cord, is connected to the lever 120 adjacent pintle 122 in opposition to the end 126 of the lever 120 to which the spring 128 is connected, the connection of the member 132 preferably including another tension spring 134. Flexible member 132 extends around an idler pulley 134 which also is fixed to the tailgate 14 and includes a portion which extends, for example, to the bearing housing 74 to which it is connected by a pin or bolt 136. From the foregoing, it will be seen that as the size of the bale reaches a desired maximum limit and at least limited expansion of the inner portion 54 of the apron 50 occurs so as to move the bearing housing 74 to the right as viewed in FIG. 4, against the action of spring 78, the flexible member 132 will move in a direction to permit the spring 128 to pivot the lever 120 to the phantom, signaling position shown in FIG. 4, whereupon when the operator sees the latter position, he will stop operation of the machine and/or the pickup head 22, as desired, and open the tailgate 14 to effect discharge of the finished bale. Under such circumstances, it is not necessary to utilize the mechanism described above for automatically disconnecting the operation of the pickup head 22 of the bale-forming machine, if desired.

The foregoing description illustrates preferred embodiments of the invention. However, concepts embodiments may, based upon such description, be employed in other embodiments without departing from the scope of the invention. Accordingly, the following claims are intended to protect the invention broadly, as well as in the specific forms shown herein.

I claim:

1. A crop baler machine to form round bales comprising in combination, a mobile frame, inner and outer set of guide members at opposite sides of said frame, an endless flexible apron extending around said set of guide members at opposite sides of said frame in a manner to form a substantially C-shaped configuration having inner and outer portions defining a bale-forming compartment, the ends of the C-shaped configuration being spaced apart to define an inlet for said bale-forming compartment adjacent the lower forward portion of said configuration to receive crop material from pickup means supported on said frame, drive means supported by said frame and engaging said apron at one end of said C-shaped configuration adjacent the top of the inlet, takeup guide means supported by said frame at the other end of said C-shaped configuration, said takeup means being supported for limited movement in a direction to increase the size of said inlet and operable to maintain said inner and outer portions of said apron taut, the inner portion of said apron being expanded a limited amount when a round bale of predetermined size and with a soft core has been formed and said takeup guide means have been moved, power means connectible to said drive means to move said apron in a direction to form a round bale, and signal means actuated by movement of said takeup guide means to indicate that a round bale of predetermined size has been formed in said bale forming compartment.

2. The crop baler machine according to claim 1 in which signal means is visual and is connected to said takeup guide means by actuating means.

3. The crop baler machine according to claim 2 in which said actuating means is a flexible member.

4. The crop baler machine according to claim 3 in which said signal means is a lever having visual indicating means on one end and movable between indicating and idle positions.

5. The crop baler machine according to claim 4 in which said lever is pivotally supported intermediate of its ends, a tension spring is connected to the end of the lever opposite the indicating means, and the flexible member has one end connected to said lever between the pivot and said indicating means.

* * * * *